Oct. 27, 1942.  S. M. DEL CAMP  2,300,349

FASTENER AND FASTENER INSTALLATION

Filed Aug. 15, 1939

Inventor:
Scipione M. Del Camp.
by John Todd
Att'y.

Patented Oct. 27, 1942

2,300,349

UNITED STATES PATENT OFFICE 2,300,349

FASTENER AND FASTENER INSTALLATION

Scipione M. Del Camp, Maywood, Ill., assignor to Cinch Manufacturing Corporation, Chicago, Ill., a corporation of Illinois Application August 15, 1939, Serial No. 290,191

2 Claims. (Cl. 24—73)

This invention relates to an improved snap fastener member for securing an apertured part such as a molding strip to an apertured supporting structure, and fastener secured installations.

Referring to the drawing, in which I have illustrated a preferred form of my invention:

Figure 1:
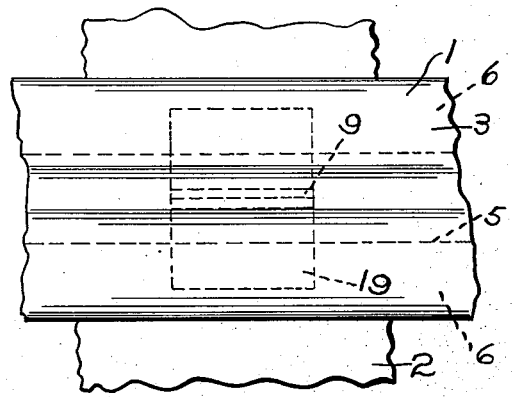
Fig. 1 is a top plan view of the installation showing a molding strip secured to a supporting structure by means of my improved fastener member.
Figure 2:
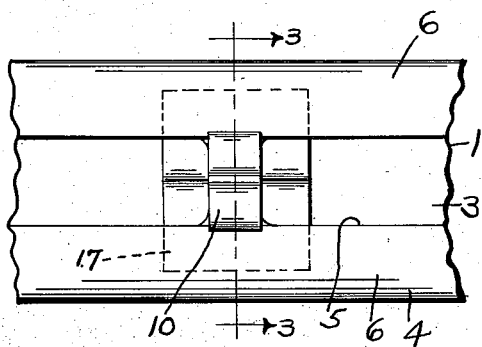
Fig. 2 is a bottom plan view showing my improved fastener member in assembly with a molding strip.
Figure 3:
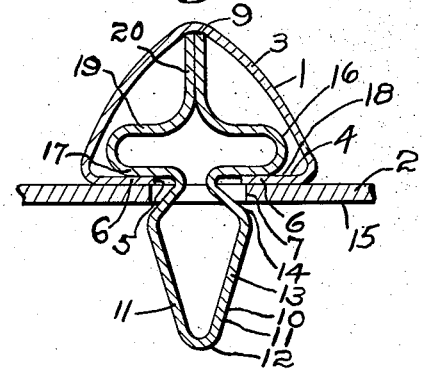
Fig. 3 is a sectional view taken along the line 3—3 of Fig. 2.
Figure 4:
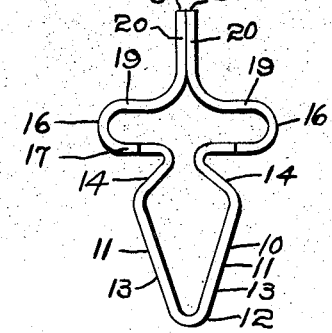
Fig. 4 is a side elevation of my improved fastener member per se.
Figure 5:
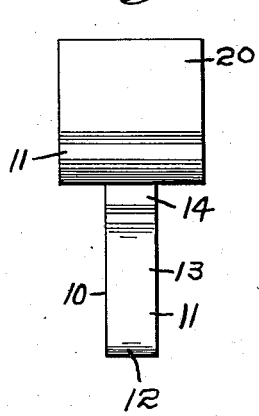
Fig. 5 is a view of the fastener member shown in Fig. 4 with the fastener member turned 90°.
Figure 6:
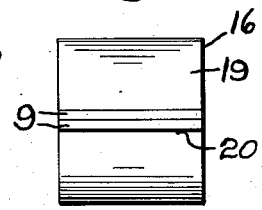
Fig. 6 is a top view of my fastener member per se.
Figure 7:
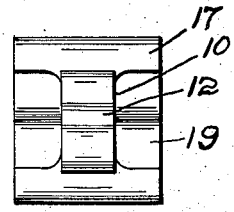
Fig. 7 is a bottom view of my fastener member per se.

My preferred installation, as illustrated in the accompanying drawing, relates particularly, though not exclusively, to a fastener secured installation in which hollow moldings and the like are quickly and easily attached to a supporting structure such as an automobile part by means of my improved fastener member. The particular installation shown in the drawing comprises an apertured part 1, such as a hollow molding of the type now frequently used for ornamenting the bodies of automobiles and the like, and a supporting panel 2. It should be understood, however, that my fastener members may be satisfactorily used for attaching other parts together than those specifically illustrated in the drawing. The molding 1 is in the form of a channeled strip of substantially triangular cross-sectional shape comprising a bowed outer side 3 and an inner side 4. The inner side 4 has a longitudinal opening 5 running the entire length thereof whereby the side 4 provides inwardly extending flanges 6—6 adjacent the opening 5. The supporting panel 2, which is preferably of metal material, is provided with a circular aperture 7 (Fig. 3) to receive the support-engaging means of the fastener member.

Referring in detail to my improved fastener member 8, I have shown one formed by bending a strip of material between its free ends 9 to form the stud shank 10. The stud shank 10 comprises legs 11—11 joined together at the leading end of the stud to form a nose 12. The legs 11—11 diverge from the nose 12 as at 13—13 and then converge as at 14—14 forming shoulders along the length of the converging portions for engagement behind the inner surface 15' of the panel 2, as most clearly shown in Fig. 3. Outwardly extending shoulders in the form of reverse-bend portions 16—16 are provided adjacent the ends of the converging portions 14—14. The reverse-bend portions 16—16 have lower sides 17 adapted to engage the inner surface 18 (Fig. 3) of the inner wall 4 to maintain the fastener member in assembly with the molding strip 1. The upper sides 19—19 of the reverse-bend portions 16 extend inwardly toward each other and stiffening portions 20—20 extend from adjacent the inner ends of the upper sides 19—19 in a direction away from the reverse-bend portions 16. The stiffening portions 20—20 are constructed, in my preferred form, to abut along their lengths thereby stiffening the action of the stud 10 during insertion thereof through the opening 7 of the supporting panel, as will be understood by those skilled in the art. In my preferred construction the stiffening portions 20—20 extend away from the upper sides 19—19 in substantially parallel relation to each other and to the axis of the stud 10. The free ends 9—9 of the stiffening portions 20—20 may engage the outer side 3 of my preferred molding at its apex. It should be understood, however, that when the fastener member is used with a molding of different cross-sectional shape than that illustrated and described, the stiffening portions may engage the moldings at other points than their free ends and also it may be possible to effect a satisfactory installation even though the stiffening portions do not in fact engage the sides of the molding.

Assembly of my fastener member with the molding is carried out through inserting the reverse-bend portions 16—16 into the molding through an open end thereof and sliding the reverse-bend portions along the molding until the stud 10 is in alignment with an opening 7 of the supporting panel. Finally the stud is inserted into the opening 7 of the panel and pressure is exerted on the molding in the direction of the panel to contract the legs 11—11 sufficiently to enable the diverging portions 13—13 to pass entirely through the opening whereupon the legs 11—11 expand to disposed the converging portions 14—14 in engagement behind the supporting panel, as most clearly shown in Fig. 3.

As a result of my improved invention, I have provided a stiffening means in the form of abuttable portions which may be easily modified, through regulating the points of abutment of the stiffening portions, to effect any desired stiffness of the panel-engaging stud. At the same time the stiffening portions may engage the inner surfaces of the sides of the molding strip to provide a firm rattle-proof asesmbly.

Although I have illustrated a preferred embodiment of my invention, I do not wish to be limited thereby because the scope of my invention is best defined by the following claims.

I claim:

1. A fastener member for securing an apertured part to an apertured supporting structure, said fastener member comprising a strip of metal bent intermediate its free ends to form a bowed shank portion for fastener engagement with said supporting structure through said aperture, outwardly extending reverse-bend portions adjacent said shank and intermediate said shank and said free ends, said reverse-bend portions being adapted to engage said apertured part, and said free ends being abuttable extending from adjacent said reverse-bend portions away from said shank in substantially parallel relation to each other and to the axis of said shank.

2. A fastener member for securing an apertured part to an apertured supporting structure, said fastener member comprising a strip of metal bent intermediate its free ends to form a bowed shank portion for fastener engagement with said supporting structure through said aperture, reverse-bend portions adjacent said shank and intermediate said shank and said free ends, each of said reverse-bend portions having a portion extending outwardly away from the axis of said shank and a portion extending reversely inwardly toward said axis, said reverse-bend portions being adapted to engage said apertured part, and said free ends extending from adjacent the inner ends of said inwardly extending portions in a direction away from said shank portion and substantially parallel to the axis of said shank portion, and said free ends being in abutting relation for substantially their entire lengths.

SCIPIONE M. DEL CAMP.